United States Patent [19]

Davis et al.

[11] 4,376,838

[45] Mar. 15, 1983

[54] CURED RUBBER SKIM STOCKS HAVING IMPROVED METAL ADHESION AND METAL ADHESION RETENTION BY USE OF ORGANO-METAL COMPLEXES AND HALOGENATED POLYMER

[75] Inventors: James A. Davis, Uniontown; Robert C. Koch, Akron, both of Ohio

[73] Assignee: The Firestone Tire & Rubber Company, Akron, Ohio

[21] Appl. No.: 244,846

[22] Filed: Mar. 18, 1981

[51] Int. Cl.$^3$ .......................... C08K 3/08; C08K 5/09; C08K 5/55; C08L 9/00
[52] U.S. Cl. .................................. 524/184; 524/183; 524/399; 524/439
[58] Field of Search ............................ 260/3.5, 3.3, 3; 525/354; 524/183, 399, 439, 184

[56] References Cited

U.S. PATENT DOCUMENTS

| | | | |
|---|---|---|---|
| 2,581,920 | 1/1952 | Kuhn | 260/5 |
| 3,596,753 | 8/1971 | Knapp et al. | 260/5 |
| 3,991,130 | 11/1976 | Cowell et al. | 525/354 |
| 3,992,334 | 11/1976 | Harvey | 260/3.3 |
| 4,077,948 | 3/1978 | Cowell et al. | 260/5 |
| 4,218,349 | 8/1980 | Minatono et al. | 260/5 |
| 4,267,979 | 5/1981 | Davis et al. | |

*Primary Examiner*—Allan Lieberman

[57] ABSTRACT

This invention is directed to an improved rubber skim stock composition and a product containing the skim stock having improved adhesion and adhesion retention with metallic reinforcement cords such as brassed steel. The invention composition comprises a conventional vulcanizable rubber skim stock, at least one halogenated polymer and at least one organo complex of cobalt or nickel. Tests conducted with brass-plated and zinc-plated steel cords showed improved metal adhesion and metal adhesion retention with use of the improved rubber skim stock of this invention when compared to control formulations.

11 Claims, No Drawings

CURED RUBBER SKIM STOCKS HAVING IMPROVED METAL ADHESION AND METAL ADHESION RETENTION BY USE OF ORGANO-METAL COMPLEXES AND HALOGENATED POLYMER

TECHNICAL FIELD

It has long been desired to improve the adhesion and adhesion retention between a rubber skim stock composition used in the manufacture of tires, conveyor belts, hoses and the like, and metallic reinforcement cord such as steel wire and cable which commonly carries a protective coating of zinc or brass.

In the manufacture of the foregoing rubber articles, particularly steel-belted bias and radial tires, it has become common to reinforce the rubber skim stock material with steel wire or cable. The metallic reinforced rubber is employed as a belt, one or more of which is circumferentially oriented beneath the tread stock to maintain the integrity and shape of the tire during inflation and subsequent load. In order for the belt to function effectively, it is imperative that adhesion between the laminate of a contiguous rubber skim stock and the steel cord be effectively maintained. Because steel is prone to oxidation, which even in minor degree is highly deleterious to the necessary adhesion with the rubber skim stock, and it would be most impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates that adhesion obtained between plated steel cord and the elastomer must be increased for improved article life and service.

BACKGROUND OF THE INVENTION AND PRIOR ART

In the production of rubber articles such as hose, pneumatic tires or power transmission belts such as V-belts, toothed positive drive belts, etc., it is generally necessary to reinforce the rubber or elastomeric product. In the past, textile materials have been primarily employed for this purpose. However, wire cord has been found to be more desirable under certain conditions of use, for example, in pneumatic tires of the radial ply type. Maximum reinforcement of the rubber is obtained when maximum adhesion is produced and retained between the laminate of a contiguous rubber skim stock and the metal reinforcing element as used to form a unitary structure. Of equal importance is the requirement that, for example, the laminate of the reinforcing metal element and contiguous rubber remain in a bonded relationship with each other throughout the useful life of the reinforced structure in which the laminate is used.

In order to promote adhesion between rubber and ferrous metals it is known to employ a variety of metallic salts as coatings to the metal or as an ingredient in a rubber composition. One early patent embodying the former technique is U.S. Pat. No. 1,919,718 which discloses a composite rubber product that adheres to ferrous metals. The invention requires the coating of the metal with a metallic salt such as that formed with copper, cobalt, manganese, iron or lead and a fatty acid of high molecular weight, e.g., stearic, palmitic, oleic, linoleic, lauric and the like. Alternatively, the metallic salt may be dissolved in a solvent or in a rubber cement which is then applied to the metal surface. The rubber layer is then applied and vulcanized in position.

U.S. Pat. No. 2,643,273 discloses a rubber adhesive composition which contains a water soluble cobalt salt to increase the adherence of rubber to metal. The specification discloses incorporating cobalt chloride or sulfate in the rubber or dipping the metal in a solution of the salt.

U.S. Pat. No. 2,912,355 is directed toward improving the adhesion between rubber and metal by the incorporation into a rubber composition of a partially oxidized metal salt of an aliphatic fatty acid compound, the metal being cobalt, copper, iron, lead, mercury, nickel or silver.

U.S. Pat. No. 3,897,583 is directed toward the adhesion of metal to rubber by incorporating a cobalt salt in a rubber stock which contains an adhesive resin forming system based on a methylene donor which is a methylolated nitroalkane in combination with a resorcinol type methylene acceptor. Cobalt salts disclosed include those of aliphatic or alicyclic carboxylic acids having 6–30 carbon atoms.

U.S. Pat. No. 3,903,026 discloses a rubber composition containing cobalt carboxylate and magnesium oxide to improve the adhesion of the rubber to zinc or zinc alloy plated steel.

U.S. Pat. No. 3,936,536 discloses the method of adhering rubber to metal by coating the metal surface with rubber containing a small amount of $Co(NH_3)_2.Cl_2$.

U.S. Pat. No. 3,993,847 discloses a process of bonding a rubber to a ferrous metal and such a laminated article. Adhesion is improved by employing an adhesive comprising a conjugated diene and a heterocyclic nitrogen base and containing about 5–180 parts of silica filler per 100 parts of the diene-heterocyclic nitrogen interpolymer. The patent states that adhesion is further improved by using a rubber containing small amounts of cobalt metal.

While others have sought to enhance adhesion between rubber compositions and metals by employing certain metallic salts and complexes with or without other compounds such as resins, the art of which we are aware, has not disclosed a satisfactory metal salt that can complement the presence of a cobalt salt when amounts of the latter are decreased and yet maintain adhesion properties as good as when the cobalt salt is utilized as the sole metal compound to improve rubber-to-metal adhesion.

U.S. Pat. No. 3,998,992 to Nakamura is directed to the replacement of a part of the conventionally used carbon black filler with finely divided high purity silica in rubber compositions to improve rubber-ferrous metal adhesion. Nakamura '992 describes the background art as including rubber-brass adhesion promoters such as cobalt naphthenate, again, an organo-cobalt compound. Nakamura '992 also discloses the use of cobalt salts of organic acids as processing aids and resin acids as accelerator activators for rubber stock to be used in tires. The use of either as independent adhesion promoters are not suggested, however.

U.S. Pat. No. 4,057,529 to Leo, et al., discloses improved rubber-metal adhesion with tire cord resulting from the compounding of rubber with a magnesium compound and a carboxylated cobalt oxy metal complex, such as carboxylated cobalt borate (0.5 to 2.5 phr). Again, the cobalt compound disclosed is an organo-cobalt compound.

U.S. Pat. No. 3,991,130 discloses the use of organo-nickel salts as adhesion promoters for vulcanizable elastomers to metals. These salts are, in fact, complexes wherein two organic ligands complex with nickel to form an organo-nickel salt.

To achieve satisfactory rubber-to-metal bonding, numerous methods have been developed. For example, U.S. Pat. No. 2,720,479 describes a system wherein a phenolic resin and a brominated isoolefin-polyolefin interpolymer are dissolved in a suitable liquid carrier and the resulting adhesive composition is spread on rubber which is to be bonded to metal. The rubber and metal are subsequently pressed together and vulcanized. U.S. Pat. No. 2,581,920 also describes the use of halogenated polymers to bond rubber to metal.

U.S. Pat. No. 2,581,920 to Kuhn describes a process of improving metal-to-rubber adhesion by the use of a blend of dichlorobutadiene (2,3-dichlorobutadiene-1,3) and certain chlorinated resins; this process is preferably practiced by coating the metallic substrate with a volatile solvent solution of the adhesive composition.

THE INVENTION

Our improved rubber skim stock contains blends of natural rubber and a minor proportion of at least one halogenated polymer, i.e., chlorobutyl or bromobutyl rubber, together with at least one organo-cobalt or organo-nickel complex for improving adhesion and adhesion retention properties between a conventional contiguous rubber skim stock and metallic reinforcement embedded therein. The organo-cobalt complex which can be used to practice our invention is commercially sold under the name "Manobond C." It is known that such materials, including Manobond C, facilitate rubber-to-metal adhesion.

Manobond C is a commercially available source of a cobalt and boron containing additive that is compatible in our formulation; it is believed to have the structure:

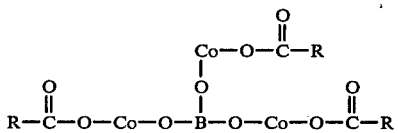

wherein each "R" is an alkyl radical of from 9 to 12 carbons. Manobond C is available as a blue, viscous liquid; it contains 15.5 to 16.5% cobalt (Manobond C 16) or it contains 17.5 to 18.5% cobalt (Manobond C 18); it has a viscosity (at 25° C.) of 3,000 to 9,000 cps. The ash content is from 22 to 25 weight percent. Manobond C is commercially available from Wyrough and Loser, Inc., Trenton, N.J.

The rubber to be used in the practice of our invention includes vulcanizable rubbers. All natural and/or synthetic rubbers can be utilized in the present invention. Rubbers that can be utilized include polydienes such as polybutadiene or polyisoprene, natural rubber, copolymers of dienes such as butadiene or isoprene with other copolymerizable monomers such as styrene, alphamethylstyrene, an acrylic ester, methylisopropenylketone, isobutylene, acrylonitrile or an unsaturated carboxylic acid; halogenated rubbers such as polychloroprene, chlorinated butyl, brominated butyl or fluorocarbon rubbers; interpolymers of one or more monolefins with a monomer which confers unsaturation on the interpolymer, for example, an unsaturated ethylene-propylene interpolymer such as ethylene-propylene-dicyclopentadiene terpolymer, sulfur-vulcanizable polyurethane rubbers; butyl rubber containing at least 0.8% unsaturation; and combinations of the above elastomers, e.g., natural rubber/butadiene-styrene copolymer blends, a mixture of a saturated copolymer of ethylene and propylene with an unsaturated interpolymer of ethylene, propylene and a monomer comprising unsaturation in the interpolymer, etc. The particular rubber composition selected is preferably a blend of natural rubber and a halogenated polymer.

The vulcanizable rubber skim compositions which can be bonded according to the present inventions will preferably contain sufficient reinforcing pigment, i.e., carbon black to contribute a reasonably high modulus and high resistance to tear. The amount of carbon black included will depend upon the desired nature of the final product. Since, although hardness is increased by increased amounts of carbon black, the resilience of the rubber, when vulcanized is reduced. The amount of carbon black in the conventional rubber skim stock can be from 25 to 80 parts by weight of carbon black for each 100 parts of rubber hydrocarbon, with about 50 to 65 parts thereof being preferred. The carbon black optionally used to practice this invention can be a reinforcing grade, such as channel black or those designated in the trade as high abrasion or super abrasion furnace blacks or even a semi-reinforcing black. The use of HAF carbon black is preferred.

In certain instances, up to as high as one-third of the carbon black can be replaced by a reinforcing grade of silica. The preferred silica is identified as Hi-Sil 233, a pelletized hydrated silica with a SiO₂ content of 95% of more on an anhydrous weight basis, commercially available, for example, from PPG Industries, Inc., Pittsburgh, Pennsylvania.

The rubber skim composition utilized in the practice of our invention can contain a processing aid, such as an extender oil or softener oil. An extender oil, when utilized, can be, for example, any known medium process oil, aromatic or naphthenic hydrocarbon derived.

Zinc oxide is an essential ingredient as an activator for the vulcanization accelerator. From 2 to about 20 parts of a fine particle size zinc oxide are generally sufficient for activation of the vulcanization accelerators. Preferred parts are from about 5 to about 10 parts.

The antioxidant selected can be, for example, N-(1,3-dimethyl butyl)-N'-phenyl-p-phenylenediamine, known in the trade as Santoflex 13; or other phenyl-p-phenylenediamine derivatives from about 0.5 to about 5.0 parts phr can be used; the use of from about 1.5 to about 3.0 is preferred.

The accelerator preferably utilized in the practice of our invention is N-oxydiethylene benzothiazole-2-sulfenamide; this accelerator is commercially available from American Cyanamid and is known as NOBS Special. Other accelerators such as N-t-butyl-2-benzothiazole-sulfenamide can also be utilized; the particular accelerator selected is not critical; from about 0.4 to about 3.0 phr can be used; the use of from about 0.7 to about 1.0 is preferred.

Vulcanization can be achieved through the use of sulfur as a sulfur/oil preblend preferably utilized at a ratio of 80/20. The 80/20 preblend consists of a naphthenic oil in the range of 18–22% oil.

Commercially available hydrocarbon resins that can be utilized in the practice of our invention include, for example, Betaprene 105 (Reichhold Chemicals Inc.) and Picco 14215 supplied by Hercules, Inc. Included are the intermediate and aliphatic hydrocarbon resins that are otherwise commercially available. The selected hydrocarbon resin will preferably have a softening point of from about 100° to about 110° C., an iodine number of from about 125 to about 167 and a maximum ash content of 0.05%. From about 2.0 to about 15.0 phr of this resin can be utilized with from about 2.0 to about 5.0 phr being preferred.

Compounding ingredients customarily employed in the rubber compounding art can be added to our skim stock composition and include accelerators, antioxidants, bactericides and the like, color pigments, extenders, reinforcing pigments, softeners, vulcanizing agents, etc. The fully compounded rubber skim compositions can be produced by mixing the ingredients of the composition in the normal manner in an internal mixer, e.g., a size B (1100.0 cc) Banbury mixer. The compounding ingredients are use in the amounts necessary to achieve the desired properties in the resulting vulcanizate as is well known to those skilled in the art.

The skim stock of the present invention can be applied by use of calendering means, spray means or other known application techniques. Areas of significant utility include, but are not limited to, radiator hose, pneumatic tires, air ride springs, metal reinforced products such as rubber bumpers and sporting goods grips such as golf club handles; in each of these representative areas of utility, the skim stock composition can be used to increase adhesion and adhesion retention properties between metal and rubber.

When the skim stock of this invention is used in steel cord tire construction, for example, it is extremely important, both in new tire construction and retread or repair operations, that the bond between the rubber ply stock and the wire fabric be as flexible and as strong as possible for efficient use under operation conditions; this is especially important in the case of truck tires which are subjected to high loads and speeds with consequent head buildup due to the rapid flexing of the plies.

The present invention also finds utility in, for example, metal-rubber articles such as motor mounts, cutless bearings, torsilastic springs, power belts, printing rolls, metal wire reinforced or braided hose, electrical deicers, shoe heels, and wherever it is desired to secure rubber to zinc plated or brassed metal to provide a flexible and strong bond between the same.

The wire coated in the practice of our invention can be, for example, brass plated wire, i.e., 70% Cu, 30% Zn, or zinc plated wire. The wire can be in the form of a strand, mat, web, ply or braid.

The rubber skim stock composition of our invention exhibits enhanced adhesion and adhesion retention with metallic reinforcement such as steel, plated with brass or zinc, and comprises a vulcanizable rubber skim stock containing at least one halogenated polymer such as chlorobutyl or bromobutyl together with an organo cobalt complex present in an amount of from about 0.25 to about 8.0 parts by weight, with about 0.50 to about 2.50 being preferred, or, an organo nickel complex present in an amount of from about 0.50 to about 12.0 parts by weight, with about 1.0 to about 4.8 being preferred. Both additives are present in parts per hundred parts of rubber (phr) based upon the weight of the elastomer in the rubber skim stock. Mixtures of halogenated polymer and/or mixtures of cobalt and/or nickel organo complexes can be used.

PREFERRED MODE FOR CARRYING OUT THE INVENTION

To illustrate our invention, a typical rubber skim stock is presented hereinbelow which is suitable for preparation of rubber articles such as tires. Adhesion between this stock with steel reinforcement subsequent to vulcanization has been measured and is also presented hereinbelow. It is to be understood that the composition of the rubber skim stock provided is conventional and is not part of the present invention and that it has been presented solely to enable those skilled in the art to have at least one rubber skim stock with which to practice the invention.

The ingredients utilized in the practice of the present invention include, for example, a blend of natural rubber with at least one halogenated polymer such as chlorobutyl or bromobutyl rubber and organo complexes of cobalt or nickel with aliphatic fatty acids, having from two to about 20 carbon atoms. The organo metal complexes can be prepared by reacting a metal hydrate with an aliphatic fatty acid. Suitable aliphatic fatty acids used to practice the present invention would be preferably, i.e., acetic, propionic, butyric, valeric, undecanoic, lauric, palmitic, stearic, nonadecanoic and the like. The metal used to prepare the complex of the aliphatic fatty acid is selected from the group consisting of cobalt and nickel.

Particularly useful in the practice of our invention is cobalt propionate, an organo-cobalt complex routinely prepared from propionic acid and cobalt hydroxide. Cobalt propionate is a purple powder having about 29% cobalt and a specific gravity of $1.68 \pm 0.1$ at 25° C. Particularly useful as the organo-nickel complex is nickel octoate prepared from octanoic acid and nickel hydrate. Nickel octoate is commercially available as a viscous green liquid having 12% nickel and a specific gravity of 1.10 at 25° C.

Amounts of the organo-cobalt complex employed can range from about 0.25 to about 8.0 parts per hundred parts of rubber (phr) with about 0.5 to about 2.5 parts (phr) of the cobalt complex being preferred. Similarly, the amount of organo-nickel complex employed can range from about 0.50 to about 12.0 phr with 3.20 phr being preferred. Other cobalt or nickel complexes of the foregoing fatty acids can be employed in substantially the same amounts. Blends of one or both of the organo-nickel and/or cobalt complexes can be utilized.

The improved rubber skim stock composition of our invention exhibits better adhesion, improved rubber coverage retention and better metal adhesion retention with metallic reinforcement such as steel, plated with brass or zinc, and comprises a vulcanizable rubber stock having from about 5 to about 30 parts of a halogenated polymer, with about 10 to 20 parts thereof being preferred. The amount of halogenated polymer added is by weight and replaces an equivalent amount of natural rubber, the total amounts of natural rubber and halogenated polymer in a rubber skim stock being equal to 100. The improved rubber skim stock has been found to have better adhesion with metallic reinforcement embedded therein than comparable stocks which do not have halogenated polymers, particularly when both are subjected to long term humidity chamber aging at 90% relative humidity and 35° C.

As stated hereinabove, practice of the present invention requires the addition of at least one halogenated polymer, such as chlorinated or brominated butyl, commonly known as chlorobutyl or bromobutyl, respectively, to the otherwise conventional natural rubber skim stock. Chlorobutyl rubber used in the following examples had from 1.1 to 1.3% chlorine by weight, 1.1 to 1.7 unsaturation, mol. % and a specific gravity of 0.92 at 25° C. The preferred bromobutyl rubber for incorporation into the rubber skim stock is Polysar's Bromobutyl X-2, a stable brominated butyl rubber having about 1.9% bromine by weight, and a specific gravity of 0.93 at 25° C.

Other halogenated polymers, i.e., DuPont's Viton A, a fluorocarbon elastomer having a specific gravity of about 1.86 or DuPont's Hypalon 30, a chlorosulfonated polyethylene polymer which contains about 43 percent chlorine by weight, 1.0 to 1.1% sulfur by weight, and having a specific gravity of about 1.26 at 25° C. can be used by one skilled in the art to practice the present invention.

Addition of the halogenated polymers is directly to the natural rubber and several other rubber chemical ingredients, i.e., carbon black, mineral fillers, zinc oxide, stearic acid, process oil, etc., to form a Banbury mixed rubber masterbatch. The remaining conventional compounding ingredients including curatives (sulfur and accelerators), cure retarder and the like are subsequently added to the rubber masterbatch by mill mixing. A blend of halogenated polymers can be used.

In order to determine the improvement in adhesion obtained when the cobalt and nickel complexes are added to the rubber skim stock containing blends of natural rubber and halogenated polymer, for example, T-adhesion tests (rubber-to-steel cord) were conducted according to the procedure which follows.

The test utilized T-adhesion pads prepared by placing 60 gauge slabs of uncured fully compounded rubber skim stock on 51 gauge fabric reinforced rubber backing. Commercial brass-coated cables (1×5×0.25 mm diam.) were placed between two pads of the reinforced skim stock with the wires in contact with the uncured rubber skim stock at 1.25 cm intervals. The width of each adhesion pad was 1.25 cm. The pads were placed in a curing mold and were cured for 30 minutes at 149° C. Testing was done on a Model 1130 Instron Universal Tester at a crosshead speed of 25.4 cm per minute and 110° C. The T-adhesion pads were preheated in the 110° C. oven for 20 minutes prior to testing. Oven aging of the cured T-adhesion pads was done in a forced air oven at 121° C. for two days. Steam bomb aging of the cured samples was done in a pressure tight bomb for one hour at 149° C., in a saturated steam atmosphere. Oxygen bomb aging of the cured T-adhesion pads was done in a pressure tight bomb at 300 psi bomb pressure, 70° C., for 24 and 48 hours in a 100% oxygen atmosphere. The significance of long term humidity chamber aging is to determine the stability of rubber-to-metal bonds formed between the contiguous rubber skim stock and the metallic reinforcement embedded therein when exposed to conditions of 90% relative humidity and 35° C. for extended periods of time (up to 210 days). The above aging tests are accelerated aging tests designed to determine the stability of the rubber-to-metal bonds formed between the rubber skim stock and the metallic reinforcement when exposed to each of the above aging conditions.

Detailed T-Adhesion Test Procedure

1. Using a Clicker machine and a 15.24×1.25 cm die, prepare an adequate number of calendered and control stock samples of T-adhesion pad building.
2. Use one piece of calendered fabric reinforced rubber backing (0.1295 cm).
3. Ply one piece of 60 gauge control rubber stock (0.1524 cm) onto the fabric backing.
4. Place sample in building jig with fabric side down.
5. Place ten cords (of brass or zinc coated wire) approximately 17.78 cm in length equally spaced on top of the two piece assembly.
6. Invert another 2 ply assembly, made as in items 1, 2 and 3, on top of cords so that cords are between the 2 layers of rubber skim stock to be tested.
7. This assembly should not fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottm to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 2.0 to obtain lbs. per linear inch.

In the test which follow, a rubber skim stock, Stock A, was prepared to which the ingredients of the present invention were added in varying amounts. Formulations for each are as follows with all parts given on the basis of parts per hundred parts of rubber (phr) by weight, unless otherwise specified. As specified below, only the control stock contains 100 parts natural rubber and 2.0 phr Manobond C-16.

| Compounding Ingredients | STOCK A |
|---|---|
| Natural Rubber | 100 (control only) |
| HAF black | 60 |
| Zinc oxide | 7.5 |
| Stearic acid | 0.5 |
| Hydrocarbon resins | 2.0 |
| Santoflex DD(a) | 2.0 |
| Dutrex 726 process oil(b) | 2.0 |
| Manobond C-16 | 2.0 (control only) |
| NOBS Special(c) | 0.80 |
| Sulfur MB(d) | 7.50 |
| Santoflex 13 AO(e) | 1.0 |
| Santogard PVI(f) | 0.4 |

IDENTIFICATION OF COMPOUNDING INGREDIENTS
(a) = 6-Dodecyl-1,2-dihydro-2,2,4-trimethylquinoline
(b) = Aromatic process oil
(c) = N—Oxydiethylene benzothiazole 2-sulfenamide
(d) = 80/20–80% 662 insoluble sulfur and 20% naphthenic process oil
(e) = N—(1,3-Dimethylbutyl)-N'—phenyl-p-phenylenediamine
(f) = N—(cyclohexylthio)-phthalimide In the tables that follow, we set forth a control stock formulation containing 100 parts natural rubber and 2 phr Manobond C-16; the composition illustrating our invention is set forth with designated amounts of a halogenated polymer together with a designated cobalt or nickel complex. The described test procedures are known and the results are self-explanatory.

TABLE I

SHORT TERM AGED WIRE ADHESION PROPERTIES: 100% NR WITH AND WITHOUT COBALT METAL VS. 85/15 NR/CHLOROBUTYL BLENDS WITH NICKEL OCTOATE

| Stock No. | A (control) | B (control) | C | D | E | F | G | H | I |
|---|---|---|---|---|---|---|---|---|---|
| Natural Rubber | 100 | 100 | 85 | 100 | 85 | 100 | 85 | 100 | 85 |
| Chlorobutyl | — | — | 15 | — | 15 | — | 15 | — | 15 |
| Manobond C-16, phr | 2 | — | — | — | — | — | — | — | — |
| Nickel octoate, phr | — | — | — | 1.60 | 1.60 | 3.20 | 3.20 | 4.80 | 4.80 |
| % metal in skim (calc.) | 0.1682 | — | — | 0.1024 | 0.1024 | 0.2031 | 0.2031 | 0.3021 | 0.3021 |

Normal (Unaged) Steelcord T-Adhesion @ 110° C. - T-Adhesion Pads Cured 30' @ 149° C.

1 × 5 × 0.25 mm diam. brass coated wire

| | | | | | | | | | |
|---|---|---|---|---|---|---|---|---|---|
| lbs./inch | 191.2 | 166.8 | 166.6 | 145.2 | 151.6 | 140.2 | 155.4 | 144 | 152.0 |
| % rubber coverage (visual) | (95–100) | (70–75) | (80–85) | (90) | (90–95) | (90) | (85) | (95) | (95) |

1 × 5 × 0.25 mm diam. zinc coated wire

| | | | | | | | | | |
|---|---|---|---|---|---|---|---|---|---|
| lbs./inch | 143.8 | 15.2 | 17.2 | 47.6 | 76 | 90.2 | 112.4 | 113.6 | 121 |
| % rubber coverage (visual) | (70) | (0) | (0) | (0) | (10–15) | (45) | (45) | (65–70) | (80) |

Oven Aged Steelcord T-Adhesion @ 110° C. - Cured 30' @ 149° C. - Cured T-Adhesion Pads Heat Aged 2 Days @ 121° C.

1 × 5 × 0.25 mm diam. brass coated wire

| | | | | | | | | | |
|---|---|---|---|---|---|---|---|---|---|
| lbs./inch | 103.4 | 87.6 | 93.2 | 71 | 104.4 | 71.6 | 108 | 83 | 101.2 |
| % rubber coverage | (90–95) | (90) | (90–95) | (85) | (95) | (90) | (90) | (95) | (95) |
| % retention | 54.1 | 52.5 | 55.9 | 48.9 | 68.9 | 51.1 | 69.5 | 57.6 | 66.6 |

1 × 5 × 0.25 mm diam. zinc coated wire

| | | | | | | | | | |
|---|---|---|---|---|---|---|---|---|---|
| lbs./inch | 88.4 | 16.2 | 17.4 | 35 | 63.8 | 45 | 75.0 | 64 | 85.4 |
| % rubber coverage | (60–65) | (0) | (0) | (0) | (10) | (15) | (20) | (45) | (55) |
| % retention | 61.5 | — | — | — | 84.0 | 49.9 | 66.7 | 56.3 | 70.6 |

Steam Bomb Aged Steelcord T-Adhesion @ 110° C. - Cured 30' @ 149° C., Cured T-Adhesion Pads Steam Aged One Hour @ 149° C.

1 × 5 × 0.25 mm diam. brass coated wire

| | | | | | | | | | |
|---|---|---|---|---|---|---|---|---|---|
| lbs./inch | 115.4 | 164.8 | 143 | 135 | 118.2 | 90 | 115 | 75.4 | 98.2 |
| % rubber coverage | (55–60) | (95) | (100) | (90) | (90) | (75–80) | (80) | (65) | (45) |
| % retention | 60.4 | 98.8 | 85.8 | 92.9 | 78.0 | 64.2 | 74.0 | 52.4 | 64.6 |

1 × 5 × 0.25 mm diam. zinc coated wire

| | | | | | | | | | |
|---|---|---|---|---|---|---|---|---|---|
| lbs./inch | 106.2 | 15.2 | 16.4 | 87.4 | 82.8 | 81.4 | 99 | 80 | 97 |
| % rubber coverage | (65) | (0) | (0) | (40) | (55)) | (60) | (60) | (60) | (65) |
| % retention | 73.9 | — | — | 183.6 | 108.9 | 90.2 | 88.1 | 70.4 | 80.2 |

Oxygen Bomb Aged Steelcord T-Adhesion @ 110° C. - Cured 30' @ 149° C., Cured T-Adhesion Pads Aged in Oxygen Atmosphere for 24 Hours @ 70° C. (300 psi bomb pressure)

1 × 5 × 0.25 mm diam. brass coated wire

| | | | | | | | | | |
|---|---|---|---|---|---|---|---|---|---|
| lbs./inch | 133.4 | 93.6 | 114.6 | 72.2 | 115 | 74.2 | 117 | 78.2 | 120.4 |
| % rubber coverage | (80) | (15–20) | (75) | (60) | (90) | (70–75) | (90) | (65–70) | (90) |
| % retention | 69.8 | 56.1 | 68.8 | 49.7 | 75.9 | 52.9 | 75.3 | 54.3 | 79.2 |

1 × 5 × 0.25 mm diam. zinc coated wire

| | | | | | | | | | |
|---|---|---|---|---|---|---|---|---|---|
| lbs./inch | 109.8 | 15.5 | 17.2 | 18 | 39.8 | 29 | 74 | 25 | 70.2 |
| % rubber coverage | (25–30) | (0) | (0) | (0) | (0) | (0) | (15–20) | (0) | (35–40) |
| % retention | 76.4 | — | — | — | 52.4 | 32.2 | 65.8 | 22.0 | 58.0 |

Oxygen Bomb Aged Steelcord T-Adhesion @ 110° C. - Cured 30' @ 149° C., Cured T-Adhesion Pads Aged in Oxygen Atmosphere for 48 Hours @ 70° C. (300 psi bomb pressure)

1 × 5 × 0.25 mm diam. brass coated wire

| | | | | | | | | | |
|---|---|---|---|---|---|---|---|---|---|
| lbs./inch | 89.6 | 97.2 | 105.8 | 51 | 106.2 | 69.6 | 103.8 | 72.4 | 94.4 |
| % rubber coverage | (25) | (35) | (55–60) | (50–55) | (95) | (65) | (95–100) | (70) | (95–100) |
| % retention | 46.9 | 58.3 | 63.5 | 35.1 | 70.1 | 49.6 | 66.8 | 50.3 | 62.1 |

1 × 5 × 0.25 mm diam. zinc coated wire

| | | | | | | | | | |
|---|---|---|---|---|---|---|---|---|---|
| lbs./inch | 61 | 16.0 | 17.6 | 17 | 47.4 | 26.5 | 60.8 | 34.5 | 55.6 |
| % rubber coverage | (0) | (0) | (0) | (0) | (0) | (5) | (15) | (15) | (10) |
| % retention | 42.4 | — | — | — | 62.4 | 29.4 | 54.1 | 30.4 | 46.0 |

TABLE II

SHORT TERM AGED WIRE ADHESION PROPERTIES: 100% NR WITH AND WITHOUT COBALT METAL VS. 80/20 NR/CHLOROBUTYL BLENDS WITH NICKEL OCTOATE

| Stock No. | A (control) | B (control) | C | D | E | F | G | H | I |
|---|---|---|---|---|---|---|---|---|---|
| Natural Rubber | 100 | 100 | 80 | 100 | 80 | 100 | 80 | 100 | 80 |
| Chlorobutyl | — | — | 20 | — | 20 | — | 20 | — | 20 |
| Manobond C-16, phr | 2 | — | — | — | — | — | — | — | — |
| Nickel octoate, phr | — | — | — | 1.60 | 1.60 | 3.20 | 3.20 | 4.80 | 4.80 |
| % metal in skim | 0.1682 | — | — | 0.1024 | 0.1024 | 0.2031 | 0.2031 | 0.3021 | 0.3021 |

TABLE II-continued

SHORT TERM AGED WIRE ADHESION PROPERTIES: 100% NR WITH AND WITHOUT COBALT METAL VS. 80/20 NR/CHLOROBUTYL BLENDS WITH NICKEL OCTOATE

| Stock No. | A (control) | B (control) | C | D | E | F | G | H | I |
|---|---|---|---|---|---|---|---|---|---|
| (calc.) | | | | | | | | | |
| Normal (Unaged) Steelcord T-Adhesion @ 110° C. - T-Adhesion Pads Cured 30' @ 149° C. | | | | | | | | | |
| 1 × 5 × 0.25 mm diam. brass coated wire | | | | | | | | | |
| lbs./inch | 191.2 | 166.8 | 141.8 | 145.2 | 146.2 | 140.2 | 140.6 | 144 | 137.4 |
| % rubber coverage | (95–100) | (70–75) | (90–95) | (90) | (95) | (90) | (95) | (95) | (95) |
| 1 × 5 × 0.25 mm diam. zinc coated wire | | | | | | | | | |
| lbs./inch | 143.8 | 15.2 | 13.4 | 47.6 | 36.4 | 90.2 | 99.2 | 113.6 | 110.4 |
| % rubber coverage | (70) | (0) | (0) | (0) | (0) | (45) | (50–55) | (65–70) | (80) |
| Oven Aged Steelcord T-Adhesion @ 110° C. - Cured 30' @ 149° C. - Cured T-Adhesion Pads Heat Aged 2 Days @ 121° C. | | | | | | | | | |
| 1 × 5 × 0.25 mm diam. brass coated wire | | | | | | | | | |
| lbs./inch | 103.4 | 87.6 | 102.3 | 71 | 99.2 | 71.6 | 99.2 | 83 | 109.2 |
| % rubber coverage | (90–95) | (90) | (90–95) | (85) | (95) | (90) | (95–100) | (95) | (95–100) |
| % retention | 54.1 | 52.5 | 72.1 | 48.9 | 67.9 | 51.1 | 70.6 | 57.6 | 79.5 |
| 1 × 5 × 0.25 mm diam. zinc coated wire | | | | | | | | | |
| lbs./inch | 88.4 | 16.2 | 15.2 | 35 | 39.0 | 45 | 76.2 | 64 | 91.0 |
| % rubber coverage | (60–65) | (0) | (0) | (0) | (0) | (15) | (65) | (45) | (65–70) |
| % retention | 61.5 | — | — | — | — | 49.9 | 76.8 | 56.3 | 82.4 |
| Steam Bomb Aged Steelcord T-Adhesion @ 110° C. - Cured 30' @ 149° C., Cured T-Adhesion Pads Steam Aged One Hour @ 149° C. | | | | | | | | | |
| 1 × 5 × 0.25 mm diam. brass coated wire | | | | | | | | | |
| lbs./inch | 115.4 | 164.8 | 143.8 | 135 | 114.4 | 90 | 130 | 75.4 | 112.4 |
| % rubber coverage | (55–60) | (95) | (95–100) | (90) | (85) | (75–80) | (95–100) | (65) | (90) |
| % retention | 60.4 | 98.8 | 101.4 | 92.9 | 78.3 | 64.2 | 92.5 | 52.4 | 81.8 |
| 1 × 5 × 0.25 mm diam. zinc coated wire | | | | | | | | | |
| lbs./inch | 106.2 | 15.2 | 18.4 | 87.4 | 50.2 | 81.4 | 96.6 | 80 | 98.2 |
| % rubber coverage | (65) | (0) | (0) | (40) | (40–45) | (60) | (60) | (60) | (65–70) |
| % retention | 73.9 | — | — | 183.6 | 137.9 | 90.2 | 97.4 | 70.4 | 89.0 |
| Oxygen Bomb Aged Steelcord T-Adhesion @ 110° C. - Cured 30' @ 149° C., Cured T-Adhesion Pads Aged in Oxygen Atmosphere for 24 Hours @ 70° C. (300 psi bomb pressure) | | | | | | | | | |
| 1 × 5 × 0.25 mm diam. brass coated wire | | | | | | | | | |
| lbs./inch | 133.4 | 93.6 | 100.6 | 72.2 | 109.8 | 74.2 | 118 | 78.2 | 123.6 |
| % rubber coverage | (80) | (15–20) | (85–90) | (60) | (90) | (70–75) | (90–95) | (65–70) | (95) |
| % retention | 69.8 | 56.1 | 71.0 | 49.7 | 75.1 | 52.9 | 83.9 | 54.3 | 90.0 |
| 1 × 5 × 0.25 mm diam. zinc coated wire | | | | | | | | | |
| lbs./inch | 109.8 | 15.5 | 11.6 | 18 | 20.8 | 29 | 73.8 | 25 | 80.9 |
| % rubber coverage | (25–30) | (0) | (0) | (0) | (0) | (0) | (40) | (0) | (70) |
| % retention | 76.4 | — | — | — | 57.1 | 32.2 | 74.4 | 22.0 | 73.3 |
| Oxygen Bomb Aged Steelcord T-Adhesion @ 110° C. - Cured 30' @ 149° C., Cured T-Adhesion Pads Aged in Oxygen Atmosphere for 48 Hours @ 70° C. (300 psi bomb pressure) | | | | | | | | | |
| 1 × 5 × 0.25 mm diam. brass coated wire | | | | | | | | | |
| lbs./inch | 89.6 | 97.2 | 106.2 | 51 | 105.6 | 69.6 | 106.2 | 72.4 | 116 |
| % rubber coverage | (25) | (35) | (80–85) | (50–55) | (95) | (65) | (100) | (70) | (90) |
| % retention | 46.9 | 58.3 | 74.9 | 35.1 | 72.2 | 49.6 | 75.5 | 50.3 | 84.4 |
| 1 × 5 × 0.25 mm diam. zinc coated wire | | | | | | | | | |
| lbs./inch | 61 | 16.0 | 18.2 | 17 | 39.6 | 26.5 | 70.2 | 34.5 | 66.4 |
| % rubber coverage | (0) | (0) | (0) | (0) | (0) | (5) | (15) | (15) | (20) |
| % retention | 42.4 | — | — | — | 108.8 | 29.4 | 70.8 | 30.4 | 60.1 |

TABLE III

LONG TERM HUMIDITY AGED WIRE ADHESION PROPERTIES: 100% NR WITH AND WITHOUT COBALT METAL VS. 85/15 AND 80/20 NR/CHLOROBUTYL BLENDS WITH NICKEL OCTOATE

| Stock No. | A (control) | B (control) | C | D | E | F | G | H |
|---|---|---|---|---|---|---|---|---|
| Compound Features | | | | | | | | |
| Natural Rubber | 100 | 100 | 85 | 100 | 85 | 80 | 100 | 80 |
| Chlorobutyl | — | — | 15 | — | 15 | 20 | — | 20 |
| Manobond C-16, phr | 2.0 | — | — | — | — | — | — | — |
| Nickel octoate, phr | — | — | — | 3.20 | 3.20 | — | 3.20 | 3.20 |
| % metal in skim (calc.) | 0.1682 | — | — | 0.2031 | 0.2031 | — | 0.2031 | 0.2031 |
| Humidity Chamber Aged Steelcord T-Adhesion @ 110° C., Cured 30' @ 149° C., Cured T-Adhesion pads aged in Humidity Chamber @ 90% Relative Humidity and 35° C. | | | | | | | | |
| 0 Day | | | | | | | | |
| 1 × 5 × 0.25 mm diam. brass coated wire | | | | | | | | |
| lbs./inch | 169.8 | 150.8 | 145.2 | 132 | 148.4 | 147.8 | 132 | 148.8 |
| % rubber coverage | (95–100) | (85) | (95–100) | (95) | (95) | (90) | (95) | (95–100) |

TABLE III-continued
LONG TERM HUMIDITY AGED WIRE ADHESION PROPERTIES: 100% NR WITH AND WITHOUT COBALT METAL VS. 85/15 AND 80/20 NR/CHLOROBUTYL BLENDS WITH NICKEL OCTOATE

| Stock No. | A (control) | B (control) | C | D | E | F | G | H |
|---|---|---|---|---|---|---|---|---|
| 1 × 5 × 0.25 mm. diam. zinc coated wire | | | | | | | | |
| lbs./inch | 129.6 | 15.2 | 18 | — | 109.8 | 19.2 | — | 114 |
| % rubber coverage | (85–90) | (0) | (0) | — | (60–70) | (0) | — | (60) |
| 30 Days | | | | | | | | |
| 1 × 5 × 0.25 mm. diam. brass coated wire | | | | | | | | |
| lbs./inch | 168.6 | 149 | 142.4 | 110 | 124.6 | 135.8 | 110 | 122.2 |
| % rubber coverage | (90–95) | (85–90) | (95) | (80–85) | (90–95) | (90–95) | (80–85) | (90) |
| 1 × 5 × 0.25 mm. diam. zinc coated wire | | | | | | | | |
| lbs./inch | 148 | 13.2 | 13 | — | 56.2 | 11.6 | — | 63.4 |
| % rubber coverage | (80) | (0) | (0) | — | (0) | (0) | — | (5) |
| 60 days | | | | | | | | |
| 1 × 5 × 0.25 mm. diam. brass coated wire | | | | | | | | |
| lbs./inch | 136 | 128 | 141 | 94 | 129 | 132 | 94 | 143 |
| % rubber coverage | (90–95) | (50) | (85) | (75) | (75–80) | (85) | (75) | (90–95) |
| % retention | 80.1 | 84.9 | 97.1 | 71.2 | 86.9 | 89.3 | 71.2 | 96.1 |
| 1 × 5 × 0.25 mm. diam. zinc coated wire | | | | | | | | |
| lbs./inch | 60 | 9.8 | 14 | — | 47 | 12 | — | 50 |
| % rubber coverage | (0) | (0) | (0) | — | (0) | (0) | — | (0) |
| 90 Days | | | | | | | | |
| 1 × 5 × 0.25 mm diam. brass coated wire | | | | | | | | |
| lbs./inch | 158.2 | 137.4 | 139.2 | 121.8 | 124 | 121.2 | 121.8 | 118.2 |
| % rubber coverage | (80–85) | (60) | (90–95) | (75) | (85–90) | (85–90) | (75) | (85) |
| 120 Days | | | | | | | | |
| 1 × 5 × 0.25 mm. diam. brass coated wire | | | | | | | | |
| lbs./inch | 138.6 | 112.4 | 133.6 | 94.8 | 129 | 118.8 | 94.8 | 123.2 |
| % rubber coverage | (85) | (60–65) | (90) | (70) | (85–90) | (85) | (70) | (85–90) |
| % retention | 81.6 | 74.5 | 92.0 | 71.8 | 86.9 | 80.4 | 71.8 | 82.8 |
| 150 Days | | | | | | | | |
| 1 × 5 × 0.25 mm. diam. brass coated wire | | | | | | | | |
| lbs./inch | 108.8 | 98.6 | 110.6 | 115 | 116.6 | 112.4 | 115 | 106.4 |
| % rubber coverage | (55) | (35) | (80–85) | (65) | (80) | (75) | (65) | (85) |
| 180 Days | | | | | | | | |
| 1 × 5 × 0.25 mm. diam. brass coated wire | | | | | | | | |
| lbs./inch | 101.6 | 96 | 126 | 78.8 | 123.6 | 129.6 | 78.8 | 119 |
| % rubber coverage | (60) | (20) | (80) | (40) | (80) | (70–75) | (40) | (85) |
| % retention | 59.8 | 63.7 | 86.8 | 59.7 | 83.3 | 87.7 | 59.7 | 80.0 |
| 210 Days | | | | | | | | |
| 1 × 5 × 0.25 mm. diam. brass coated wire | | | | | | | | |
| lbs./inch | 112.8 | 99.8 | 117.4 | 84 | 116.6 | 121 | 84 | 122.8 |
| % rubber coverage | (60–65) | (20–25) | (80) | (55) | (80) | (75–80) | (55) | (80–85) |
| % retention | 66.4 | 66.2 | 80.9 | 63.6 | 78.6 | 81.9 | 63.6 | 82.5 |

TABLE IV
SHORT TERM AGED WIRE ADHESION PROPERTIES: 100% NR WITH AND WITHOUT COBALT METAL VS. 85/15 NR/HALOBUTYL RUBBER BLENDS WITH MANOBOND C-16

| Stock No. | A (control) | B (control) | C | D | E |
|---|---|---|---|---|---|
| Natural rubber | 100 | 100 | 85 | 85 | 85 |
| Chlorobutyl | — | — | 15 | 15 | — |
| Bromobutyl | — | — | — | — | 15 |
| Manobond C-16, phr | 2 | — | — | 2 | 2.0 |
| % metal in skim (calc.) | 0.1682 | — | — | 0.1682 | 0.1682 |
| Normal (Unaged) Steelcord T-Adhesion @ 110° C. - T-Adhesion Pads Cured 30' @ 149° C. | | | | | |
| 1 × 5 × 0.25 mm. diam. brass coated wire | | | | | |
| lbs./inch | 162 | 166.8 | 166.6 | 147 | 150 |
| % rubber coverage | (100) | (70–75) | (80–85) | (100) | (100) |
| 1 × 5 × 0.25 mm. diam. zinc coated wire | | | | | |
| lbs./inch | 139 | 15.2 | 17.2 | 134 | 144 |
| % rubber coverage | (90) | (0) | (0) | (95) | (95) |
| Oven Aged Steelcord T-Adhesion @ 110° C. - Cured 30' @ 149° C. - Cured T-Adhesion Pads Heat Aged 2 Days @ 121° C. | | | | | |
| 1 × 5 × 0.25 mm. diam. brass coated wire | | | | | |
| lbs./inch | 76 | 87.6 | 93.2 | 87 | 97 |
| % rubber coverage | (85–90) | (90) | (90–95) | (95) | (90) |
| % retention | 46.9 | 52.5 | 55.9 | 59.2 | 64.7 |
| 1 × 5 × 0.25 mm. diam. zinc coated wire | | | | | |
| lbs./inch | 83 | 16.2 | 17.4 | 96 | 98 |
| % rubber coverage | (60) | (0) | (0) | (90) | (90) |
| % retention | 59.7 | — | — | 71.6 | 68.1 |
| Steam Bomb Aged Steelcord T-Adhesion @ 110° C. - Cured 30' @ 149° C., Cured T-Adhesion Pads Steam Aged One Hour @ 149° C. | | | | | |
| 1 × 5 × 0.25 mm. diam. brass coated wire | | | | | |
| lbs./inch | 111 | 164.8 | 143 | 128 | 135 |
| % rubber coverage | (60–65) | (95) | (100) | (100) | (100) |
| % retention | 68.5 | 98.8 | 85.8 | 87.1 | 90.0 |
| 1 × 5 × 0.25 mm. diam. zinc coated wire | | | | | |
| lbs./inch | 106.2 | 15.2 | 16.4 | 120 | 121 |
| % rubber coverage | (65) | (0) | (0) | (95) | (95) |
| % retention | 73.9 | — | — | 89.6 | 84.0 |
| Oxygen Bomb Aged Steelcord T-Adhesion @ 110° C. - Cured 30' @ 149° C., Cured T-Adhesion Pads Aged in Oxygen Atmosphere for 24 Hours @ 70° C. (300 psi bomb pressure) | | | | | |
| 1 × 5 × 0.25 mm. diam. brass coated wire | | | | | |
| lbs./inch | 105 | 93.6 | 114.6 | 129 | 135 |
| % rubber coverage | (55) | (15–20) | (75) | (95) | (95) |

TABLE IV-continued
SHORT TERM AGED WIRE ADHESION PROPERTIES: 100% NR WITH AND WITHOUT COBALT METAL VS. 85/15 NR/HALOBUTYL RUBBER BLENDS WITH MANOBOND C-16

| Stock No. | A (control) | B (control) | C | D | E |
|---|---|---|---|---|---|
| % retention | 64.8 | 56.1 | 68.8 | 87.8 | 90.0 |
| 1 × 5 × 0.25 mm diam. zinc coated wire | | | | | |
| lbs./inch | 109.8 | 15.5 | 17.2 | 100 | 110 |
| % rubber coverage | (25-30) | (0) | (0) | (65-70) | (70-75) |
| % retention | 76.4 | — | — | 74.6 | 76.4 |

Oxygen Bomb Aged Steelcord T-Adhesion @ 110° C. - Cured 30' @ 149° C., Cured T-Adhesion Pads Aged in Oxygen Atmosphere for 48 Hours @ 70° C. (300 psi bomb pressure)

| Stock No. | A (control) | B (control) | C | D | E |
|---|---|---|---|---|---|
| 1 × 5 × 0.25 mm diam. brass coated wire | | | | | |
| lbs./inch | 69 | 97.2 | 105.8 | 81 | 100 |
| % rubber coverage | (10) | (35) | (55-60) | (50) | (85) |
| % retention | 42.6 | 58.3 | 63.5 | 55.1 | 66.7 |
| 1 × 5 × 0.25 mm diam. zinc coated wire | | | | | |
| lbs./inch | 29 | 16.0 | 17.6 | 36 | 42 |
| % rubber coverage | (0) | (0) | (0) | (0) | (0) |
| % retention | 20.9 | — | — | 26.9 | 29.2 |

TABLE V
SHORT TERM AGED WIRE ADHESION PROPERTIES: 100% NR WITH AND WITHOUT COBALT METAL VS. 85/15 NR/HALOBUTYL RUBBER BLENDS WITH COBALT PROPIONATE

| Stock No. | A (control) | B (control) | C | D | E | F |
|---|---|---|---|---|---|---|
| Natural rubber | 100 | 100 | 100 | 85 | 85 | 85 |
| Chlorobutyl | — | — | — | 15 | 15 | — |
| Bromobutyl | — | — | — | — | — | 15 |
| Manobond C-16, phr | 2 | — | — | — | — | — |
| Cobalt Propionate, phr | — | — | 1.30 | — | 1.30 | 1.30 |
| % metal in skim (calc.) | 0.1682 | — | 0.2013 | — | 0.2013 | 0.2013 |

Normal (Unaged) Steelcord T-Adhesion @ 110° C. - T-Adhesion Pads Cured 30' @ 149° C.

| | A | B | C | D | E | F |
|---|---|---|---|---|---|---|
| 1 × 5 × 0.25 mm diam. brass coated wire | | | | | | |
| lbs./inch | 162 | 166.8 | 174 | 166.6 | 139 | 147 |
| % rubber coverage | (100) | (70-75) | (95) | (80-85) | (100) | (100) |
| 1 × 5 × 0.25 mm diam. zinc coated wire | | | | | | |
| lbs./inch | 139 | 15.2 | 171 | 17.2 | 134 | 151 |
| % rubber coverage | (90) | (0) | (95) | (0) | (100) | (95) |

Oven Aged Steelcord T-Adhesion @ 110° C. - Cured 30' @ 149° C. - Cured T-Adhesion Pads Heat Aged 2 Days @ 121° C.

| | A | B | C | D | E | F |
|---|---|---|---|---|---|---|
| 1 × 5 × 0.25 mm diam. brass coated wire | | | | | | |
| lbs./inch | 76 | 87.6 | 87.4 | 93.2 | 92 | 103 |
| % rubber coverage | (85-90) | (90) | (90) | (90-95) | (95) | (90) |
| % retention | 46.9 | 52.5 | 50.2 | 55.9 | 66.2 | 70.0 |
| 1 × 5 × 0.25 mm diam. zinc coated wire | | | | | | |
| lbs./inch | 83 | 16.2 | 79.2 | 17.4 | 102 | 93 |
| % rubber coverage | (60) | (0) | (75) | (0) | (90) | (90) |
| % retention | 59.7 | — | 46.3 | — | 76.1 | 61.6 |

Steam Bomb Aged Steelcord T-Adhesion @ 110° C. - Cured 30' @ 149° C., Cured T-Adhesion Pads Steam Aged One Hour @ 149° C.

| | A | B | C | D | E | F |
|---|---|---|---|---|---|---|
| 1 × 5 × 0.25 mm diam. brass coated wire | | | | | | |
| lbs./inch | 111 | 164.8 | 132.6 | 143 | 121 | 120 |
| % rubber coverage | (60-65) | (95) | (90-95) | (100) | (100) | (100) |
| % retention | 68.5 | 98.8 | 76.2 | 85.8 | 87.1 | 81.6 |
| 1 × 5 × 0.25 mm diam. zinc coated wire | | | | | | |
| lbs./inch | 106.2 | 15.2 | 112 | 16.4 | 107 | 111 |
| % rubber coverage | (65) | (0) | (90) | (0) | (95) | (95-100) |
| % retention | 76.4 | — | 65.5 | — | 79.9 | 73.5 |

Oxygen Bomb Aged Steelcord T-Adhesion @ 110° C. - Cured 30' @ 149° C., Cured T-Adhesion Pads Aged in Oxygen Atmosphere for 24 Hours @ 70° C. (300 psi bomb pressure)

| | A | B | C | D | E | F |
|---|---|---|---|---|---|---|
| 1 × 5 × 0.25 mm diam. brass coated wire | | | | | | |
| lbs./inch | 105 | 93.6 | 92.6 | 114.6 | 109 | 129 |
| % rubber coverage | (55) | (15-20) | (65) | (75) | (90) | (95) |
| % retention | 64.8 | 56.1 | 53.2 | 68.8 | 78.4 | 87.8 |
| 1 × 5 × 0.25 mm diam. zinc coated wire | | | | | | |
| lbs./inch | 109.8 | 15.5 | 112.6 | 17.2 | 120 | 123 |
| % rubber coverage | (25-30) | (0) | (75) | (0) | (95-100) | (100) |
| % retention | 79.0 | — | 65.8 | — | 89.6 | 81.5 |

Oxygen Bomb Aged Steelcord T-Adhesion @ 110° C. - Cured 30' @ 149° C., Cured T-Adhesion Pads Aged in Oxygen Atmosphere for 48 Hours @ 70° C. (300 psi bomb pressure)

| | A | B | C | D | E | F |
|---|---|---|---|---|---|---|
| 1 × 5 × 0.25 mm diam. brass coated wire | | | | | | |
| lbs./inch | 69 | 97.2 | 76 | 105.8 | 68 | 92 |
| % rubber coverage | (10) | (35) | (35) | (55-60) | (50) | (55) |

TABLE V-continued

SHORT TERM AGED WIRE ADHESION PROPERTIES:
100% NR WITH AND WITHOUT COBALT METAL VS.
85/15 NR/HALOBUTYL RUBBER BLENDS
WITH COBALT PROPIONATE

| Stock No. | A (control) | B (control) | C | D | E | F |
|---|---|---|---|---|---|---|
| % retention | 42.6 | 58.3 | 43.7 | 63.5 | 48.9 | 62.6 |
| 1 × 5 × 0.25 mm diam. zinc coated wire | | | | | | |
| lbs./inch | 29 | 16.0 | 96.7 | 17.6 | 59 | 68 |
| % rubber coverage | (0) | (0) | (60–65) | (0) | (15) | (25–30) |
| % retention | 20.9 | — | 56.5 | — | 44.0 | 45.0 |

TABLE VI

LONG TERM HUMIDITY AGED WIRE ADHESION PROPERTIES:
100% NR WITH AND WITHOUT COBALT METAL VS. 85/15 NR/HALOBUTYL
RUBBER BLENDS WITH ORGANO-COBALT COMPLEXES

| Stock No. | A (control) | B (control) | C | D | E | F | G | H |
|---|---|---|---|---|---|---|---|---|
| Compound Features | | | | | | | | |
| Natural Rubber | 100 | 100 | 100 | 85 | 85 | 85 | 85 | 85 |
| Chlorobutyl | — | — | — | 15 | 15 | 15 | — | — |
| Bromobutyl | — | — | — | — | — | — | 15 | 15 |
| Manobond C-16, phr | 2.0 | — | — | — | 2.0 | — | 2.0 | — |
| Co Propionate, phr | — | 1.25 | — | — | — | 1.30 | — | 1.30 |
| % metal in skim (calc.) | 0.1682 | 0.1937 | — | — | 0.1682 | 0.2013 | 0.1682 | 0.2013 |

Humidity Chamber Aged Steelcord T-Adhesion @ 110° C., Cured 30' @ 149° C., Cured T-Adhesion Pads Aged in Humidity Chamber @ 90% Relative Humidity and 35° C.

| | A | B | C | D | E | F | G | H |
|---|---|---|---|---|---|---|---|---|
| 0 Day | | | | | | | | |
| 1 × 5 × 0.25 mm. diam. brass coated wire | | | | | | | | |
| lbs./inch | 169.8 | 168 | 150.8 | 145.2 | 176.4 | 163.2 | 189.2 | 171 |
| % rubber coverage | (95–100) | (100) | (95) | (95–100) | (100) | (100) | (100) | (100) |
| 30 Days | | | | | | | | |
| 1 × 5 × 0.25 mm. diam. brass coated wire | | | | | | | | |
| lbs./inch | 168.6 | 158 | 149 | 142.4 | 145.4 | 145.8 | 173.8 | 145.4 |
| % rubber coverage | (90–95) | (100) | (85–90) | (95) | (100) | (95) | (100) | (100) |
| 60 Days | | | | | | | | |
| 1 × 5 × 0.25 mm. diam. brass coated wire | | | | | | | | |
| lbs./inch | 136 | 144 | 128 | 141 | 146.6 | 146.4 | 155.2 | 144.8 |
| % rubber coverage | (90–95) | (95–100) | (50) | (85) | (95–100) | (95) | (95–100) | (100) |
| % retention | 80.1 | 85.7 | 84.9 | 97.1 | 83.1 | 89.7 | 82.0 | 84.7 |
| 90 Days | | | | | | | | |
| 1 × 5 × 0.25 mm. diam. brass coated wire | | | | | | | | |
| lbs./inch | 158.2 | 154.4 | 137.4 | 139.2 | 149.8 | 135.2 | 160 | 147.2 |
| % rubber coverage | (80–85) | (95–100) | (60) | (90–95) | (90–95) | (95) | (95) | (90–95) |
| 120 Days | | | | | | | | |
| 1 × 5 × 0.25 mm diam. brass coated wire | | | | | | | | |
| lbs./inch | 138.6 | 136.8 | 112.4 | 133.6 | 138.4 | 138.8 | 147.2 | 144 |
| % rubber coverage | (85) | (85–90) | (60–65) | (90) | (85–90) | (95–100) | (95) | (95) |
| % retention | 81.6 | 81.4 | 74.5 | 92.0 | 78.5 | 85.1 | 77.8 | 84.2 |
| 150 Days | | | | | | | | |
| 1 × 5 × 0.25 mm. diam. brass coated wire | | | | | | | | |
| lbs./inch | 108.8 | 125.8 | 98.6 | 110.6 | 122.8 | 137.8 | 139.4 | 132.8 |
| % rubber coverage | (55) | (85) | (35) | (80–85) | (80–85) | (85–90) | (90) | (90) |
| 180 Days | | | | | | | | |
| 1 × 5 × 0.25 mm. diam. brass coated wire | | | | | | | | |
| lbs./inch | 101.6 | 136.2 | 96 | 126 | 146 | 140.2 | 151.4 | 142.2 |
| % rubber coverage | (60) | (85) | (20) | (80) | (90) | (95–100) | (90) | (100) |
| % retention | 59.8 | 81.1 | 63.7 | 86.8 | 82.8 | 85.9 | 80.0 | 83.2 |
| 210 Days | | | | | | | | |
| 1 × 5 × 0.25 mm. diam. brass coated wire | | | | | | | | |
| lbs./inch | 112.8 | — | 99.8 | 117.4 | 142.4 | 137.4 | 155.6 | 144.8 |
| % rubber coverage | (60–65) | — | (20–25) | (80) | (90) | (90–95) | (90) | (95–100) |
| % retention | 66.4 | — | 66.2 | 80.9 | 80.7 | 84.2 | 82.2 | 84.7 |

In the preceding tables, the force necessary to pull out or remove the metallic reinforcement from the vulcanized rubber skim stock is given first, in lbs./linear inch followed by the percent of rubber skim stock (visual determination) remaining on the surface of the metallic reinforcement. The amount of rubber skim stock remaining on the metallic reinforcement was determined solely by visual examination and has been reported as % rubber coverage remaining on the surface of the metallic reinforcement.

Based on the foregoing results reported in Tables I through VI, we consider the presence of at least one halogenated polymer and at least one organo-cobalt or nickel complex in a rubber skim stock to be effective in promoting and improving adhesion between the rubber skim stock and metallic reinforcement. As stated hereinabove, the wire coated in the practice of our invention can be, for example, brass-plated wire, i.e., 70% Cu, 30% Zn; or, zinc-plated. The wire can be in the form of a strand, mat, web, ply or braid.

The oven aging test (two days at 121° C. in a forced air oven) is an accelerated heat aging test and is significant in determining the effect of heat on the thermal stability of the chemical bonds formed between the rubber skim stock and the metallic reinforcement during vulcanization.

Steam bomb aging for one hour at 149° C. is an accelerated moisture aging test and is significant in determining the chemical stability of the chemical bonds formed between the rubber skim stock and the metallic reinforcement when exposed to moisture or steam under pressure.

Oxygen bomb aging for 24 and 48 hours at 70° C. is an accelerated oxygen aging test and is significant in determining the chemical stability of the rubber-to-metal bonds formed between the contiguous rubber skim stock and the metallic reinforcement when exposed to an oxygen atmosphere under 300 psi bomb pressure.

Tables III and VI, representing the effect of humidity chamber aging, show that the controls (Stocks A and B) gradually lost adhesive properties with aging. The effect of humidity aging was somewhat minimized for the stocks of examples E and H in Table III and E, F, G, H in Table VI which had particularly higher percent rubber coverage retention after 210 days aging when compared to the controls. The significance of the humidity chamber test is again in determining the chemical stability of rubber-to-metal bonds formed between the contiguous rubber skim stock and the metallic reinforcement when exposed to conditions of 90% relative humidity and 35° C., as compared to ambient temperature, and extended periods of time.

In the practice of our invention, blends of different halogenated polymers and blends of different organo-cobalt complexes or blends of different organo-nickel complexes can be utilized; one can also use blends of organo-cobalt and organo-nickel complexes. The curing system selected can be one that is sulfur curable by vulcanization; chemical curing means can be used as can be curing with radiation. Our improved system can be vulcanized using, for example, metal oxides such as zinc oxide; curing resins such as alkyl phenol disulfides (e.g. Vultac series) and one or more of the following conventional accelerators, e.g., zinc dithiocarbamate, tetramethylthiuram disulfide and benzothiazyl disulfide.

The preceding examples can be varied within the scope of our total specification disclosure, as it would be understood and practiced by one skilled in the art, to achieve essentially the same results. Equivalent reactants can be used within the designated ranges specified.

The present invention also finds utility in, for example, brassed metal-rubber articles such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

As will be apparent to those skilled in the art, the composition of our improved rubber skim stock can be varied within the scope of our total specification disclosure by the selection of halogenated polymer and the various organo-metal complexes of cobalt or nickel as well as the amounts thereof, and it is believed that the preparation and use of these according to the preferred method of the invention can be determined without departing from the spirit of the invention herein disclosed and described, the scope of the invention being limited solely by the scope of the attached claims.

We claim:

1. In an improved cured rubber skim stock of conventional composition, bonded to at least one metal member contained in it, the improvement which comprises incorporating into said stock prior to curing a minor, but metal adhesion - promoting and - retaining amount of the combination of (a) about 5–30 phr of at least one halogenated polymer and (b) about 0.25–8.0 phr of at least one organo-cobalt or about 0.5–12 phr of organo-nickel complex, said halogenated polymer (a) being chlorobutyl rubber, bromobutyl rubber, fluorocarbon elastomer of specific gravity about 1.86, or chlorosulfonated polyethylene polymer containing about 43% chlorine and 1.0 to 1.1% sulfur and having a specific gravity of about 1.26 at 25° C., and said complex (b) being Manobond C represented by the general formula

$$(R-\overset{O}{\underset{\|}{C}}OCo-O)\,B$$

wherein each R is an alkyl radical of from 9 to 12 carbons or organo carboxylate complexes of cobalt or nickel with aliphatic fatty acids having from 2 to about 20 carbon atoms.

2. A composition according to claim 1 wherein said halogenated polymer is chlorobutyl rubber and said cobalt complex is cobalt propionate.

3. A composition according to claim 1 wherein said nickel complex is nickel octoate.

4. A stock according to claim 1 wherein the halogenated polymer (a) is a blend of chlorobutyl and bromobutyl rubber.

5. A stock according to claim 4 wherein the complex is Manobond C, cobalt propionate or nickel octoate.

6. A tire containing the cured rubber skim stock of claim 1 and having reinforcing metal members embedded therein.

7. A tire according to claim 6 wherein said curing is achieved by vulcanization.

8. A tire according to claim 6 wherein said halogenated polymer is chlorobutyl rubber and said cobalt complex is cobalt propionate.

9. A tire according to claim 6 wherein said nickel complex is nickel octoate.

10. A tire according to claim 6 wherein said halogenated polymer is bromobutyl rubber and said cobalt complex is cobalt propionate.

11. A tire according to claim 6 wherein said halogenated polymer is bromobutyl rubber and said nickel complex is nickel octoate.

* * * * *